United States Patent [19]
Sze

[11] Patent Number: 4,909,882
[45] Date of Patent: Mar. 20, 1990

[54] APPLYING A DESIGN TO THE INSIDE WALL OF A TRANSPARENT WHERE IT CANNOT BE REACHED BY THE HAND

[76] Inventor: Li C. Sze, D, 5/F., 41 Po Kong Lane, Kowloon, Hong Kong

[21] Appl. No.: 311,395

[22] Filed: Feb. 16, 1989

Related U.S. Application Data

[63] Continuation of Ser. No. 84,248, Aug. 12, 1987, abandoned.

[30] Foreign Application Priority Data

Sep. 24, 1986 [CN] China ................................ 86106465

[51] Int. Cl.⁴ .......................... B44C 1/16; B32B 31/00

[52] U.S. Cl. .................................... 156/240; 156/249; 156/287; 156/293; 156/303.1

[58] Field of Search ................. 156/104, 100, 63, 230, 156/235, 236, 239, 240, 246, 247, 249, 285, 286, 287, 293, 294, 303.1, 312; 434/84, 101

[56] References Cited

U.S. PATENT DOCUMENTS

| | | | |
|---|---|---|---|
| 781,800 | 2/1905 | Ziegler | 156/240 |
| 2,265,531 | 12/1941 | Laxer | 156/240 |
| 2,546,360 | 3/1951 | Farrow et al. | 156/230 |
| 2,664,373 | 12/1953 | Reilly | 156/287 |
| 3,549,446 | 12/1970 | Bennett et al. | 156/287 |
| 3,785,912 | 1/1974 | Van Deusen | 156/240 |
| 4,216,286 | 8/1980 | Greene et al. | 156/288 |
| 4,321,101 | 3/1982 | Preiser et al. | 156/249 |
| 4,355,722 | 10/1982 | Lemmeyer | 156/63 |
| 4,407,686 | 10/1983 | Cook et al. | 156/230 |

FOREIGN PATENT DOCUMENTS 54-6612 6/1977 Japan .

*Primary Examiner*—Michael W. Ball
*Assistant Examiner*—Louis Falasco
*Attorney, Agent, or Firm*—Armstrong, Nikaido, Marmelstein, Kubovcik & Murray

[57] ABSTRACT

The invention relates to a kind of art of applying designs to the inside wall of transparent containers where the hand cannot directly reach into contact. This art consists chiefly of filling the container to be decorated with a liquid, inserting a decal cellophane which is lined with a backing paper into the container. After the decal cellophane is applied to the inside wall of the container, drain the liquid away from the container and then bake the container. The production cost of this art is low and it is suitable for mass production. The final products possess special characteristics of elaborate workmanship, longlasting decoration, water-, alcohol-, and heat-resistance. It is suitable to be applied on perfume bottles, lamps and vase, etc.

6 Claims, No Drawings

APPLYING A DESIGN TO THE INSIDE WALL OF A TRANSPARENT WHERE IT CANNOT BE REACHED BY THE HAND

This application is a continuation of application Ser. No. 084,248 filed Aug. 12, 1987 now abandoned.

The present invention relates to a new art of applying a design to the inside wall of a transparent container where it cannot be directly reached by the hand.

The art of applying design to a surface of a container has a long history but, in general, in the above process, the hand can directly reach the surface of the container where the process of applying a design thereto is being carried out. For example, the Japanese Letters of Patents No. Sho 54-89812 and No. Sho 54-6612, which have been found after a search relate to applying designs to trays or to the outside surfaces of containers. However, should there be a need for applying a design to the inside wall of a container with a small mouth (that is, when the hand cannot reach directly into the inside of the container), then this work cannot be done by existing techniques. The decoration can only be made by inner painting, such as the inner painted snuff bottles, which is a labour-intensive and time-consuming job. The costs are quite high and mass production is not possible.

The purpose of the present invention is to provide a new art of applying a design to the inside surface of a transparent container, such as a glass container, where the hand cannot reach directly, and to provide a method suitable for industrial production.

This process of the art is carried out by filling the transparent container to be decorated with water and inserting a roll of decal cellophane which is lined with a backing paper, into the container. In the water, the decal cellophane comes off from the backing paper automatically. Then, remove the backing paper out of the container, locate the decal cellophane to its correct position on the inside wall of the container, and drain off the liquid. Then, with the help of a small bamboo stick or the like, place the decal cellophane onto its exactly right position while smoothing out the air bubbles between the decal cellophane and the inside wall of the container. Put the container upside down to let the water drain away thoroughly. Then, dry it in a shady place, When the water is completely evaporated, bake the container according to the temperature and time as specified on the decal paper. Or, put the decal paper in another container filled with a liquid and wait until the decal cellophane comes off from the backing paper automatically, roll the decal cellophane onto a small bamboo stick or the like and insert it into the transparent container to be decorated, which is filled with a liquid such as water. Locate the decal cellophane to its correct position on the inside wall of the transparent container and drail the liquid away from the transparent container. Then, with the help of a small bamboo stick or the like, place the decal cellophane onto its exactly right position while smoothing out the air bubbles between the decal cellophane and the inside wall of the container. Put the container upside down to let the liquid drain away thoroughly. Then dry it in a shady place. When the water is completely evaporated, bake the container according to the temperature and time as specified on the decal paper.

The above method of applying a design to the inside wall of a transparent container is lower in cost, easier to process and more suitable for mass production as compared with the art of inner painting. Moreover, this kind of decal inner-decorated transparent container is distinguished for brightly coloured appearance, elaborate workmanship. The decal decoration is long lasting and resistant to water, alcohol and high temperature. The method can be used in the decoration of perfume bottles, lamps, vases, ornaments, and tinkle bells etc. To replace the magic art of inner painting with inside decal printing will facilitate the popularization and industrialized production.

A practical example of the process of applying a design to the inside wall of a snuff bottle is as follows.

To fill the snuff bottle with water. Roll up the decal cellophane which is lined with a backing paper, and insert it into the snuff bottle. Soaked in water, the decal cellophane will automatically come off from the backing paper. Remove the backing paper with a pair of tweezers and put the decal cellophane onto its correct position. Suck the water out of the bottle, and at the same time, locate the decal cellophane into its exactly right position with a small bamboo stick or the like and smooth out the air bubbles between the decal cellophane and the inside wall of the snuff bottle. Then bake the snuff bottle at a low temperature until it become thoroughly dry. Bake again according to the required temperature and time as specified on the decal paper. Then the cellophane lining on the decal will volatilize automatically and the design remains on the inside wall of the snuff bottle. When it cools down to normal temperature, the process of applying a design to the inside wall of the snuff bottle is completed.

I claim:

1. A method for applying a design to an inside wall of a transparent container where said inside wall cannot be directly reached by hand comprising the steps of:
   - rolling a decal cellophane having thereon said design to be applied onto a small stick;
   - filling said transparent container to be decorated with liquid;
   - inserting said rolled decal cellophane into said liquid in said transparent container and suspending said decal cellophane in said liquid;
   - unrolling said decal cellophane with the help of the stick and a floating force of the liquid and positioning said decal cellophane on said inside wall of said transparent container with said design against said inside wall;
   - draining said liquid and removing said small stick from said container;
   - smoothing out bubbles between said decal cellophane and said inside wall of said container with smoothing means;
   - removing remaining liquid from said transparent container;
   - drying said transparent container; and
   - baking said dried transparent container with said decal cellophane thereon and said design against said inside wall to affix said design to said inside wall.

2. A method for applying a design to an inside wall of a transparent container as claimed in claim 1, wherein said decal cellophane is lined with a backing paper which detaches itself from said decal cellophane upon insertion into said liquid.

3. A method for applying a design to an inside wall of a transparent container as claimed in claim 1 that before insertion of said decal cellophane into said transparent container said decal cellophane which is initially lined with a backing paper is inserted into a second container filled with liquid whereby said backing paper detaches itself from said decal cellophane.

4. A method for applying a design to an inside wall of a transparent container as claimed in claim 2, further comprising the step of removing said backing paper from said transparent container.

5. A method for applying a design to an inside wall of transparent container as claimed in claim 1, wherein said container is glass.

6. A method for applying a design to an inside wall of a transparent container as claimed in claim 1, wherein said smoothing means is a small bamboo stick.

* * * * *